United States Patent [19]
Yamakawa et al.

[11] Patent Number: 5,736,081
[45] Date of Patent: Apr. 7, 1998

[54] METHOD AND APPARATUS FOR FORMING COMPOSITE MATERIAL INCLUDING SOLID FILLER PARTICLES

[75] Inventors: Yoshihiro Yamakawa, Komaki; Masaru Takino, Kakamigahara; Masatoshi Nozaki, Kasugai; Tadashi Miyawaki, Owakura, all of Japan

[73] Assignee: Mitsuboshi Belting Ltd., Nagata, Japan

[21] Appl. No.: 924,783

[22] Filed: Aug. 4, 1992

Related U.S. Application Data

[63] Continuation of Ser. No. 581,767, Sep. 13, 1990, abandoned.

[30]  Foreign Application Priority Data

Sep. 13, 1989 [JP] Japan .................... 1-237570

[51] Int. Cl.$^6$ .............................. B29C 39/10; B29C 70/42
[52] U.S. Cl. ..................... 264/113; 264/122; 264/128
[58] Field of Search ...................... 264/113, 122, 264/128, 135, 258, 259; 425/388, 389

[56] References Cited

U.S. PATENT DOCUMENTS

| | | | |
|---|---|---|---|
| 286,693 | 10/1883 | Fried | 425/389 |
| 2,363,306 | 8/1944 | Fiske | 264/128 |
| 3,193,440 | 7/1965 | Schafer | 264/128 |
| 3,682,741 | 8/1972 | Elliot et al. | 264/46.4 |
| 4,078,031 | 3/1978 | Bishop | 264/259 |
| 4,312,829 | 1/1982 | Fourcher | 425/389 |
| 4,378,401 | 3/1983 | Wright | 264/128 |
| 4,923,550 | 5/1990 | Kramer | 264/259 |

FOREIGN PATENT DOCUMENTS 5434375  3/1979  Japan ................ 264/46.4

Primary Examiner—Angela Y. Oritz
Attorney, Agent, or Firm—Wood, Phillips, VanSanten, Clark & Mortimer

[57] ABSTRACT

A method of forming a composite material including the steps of: providing a surface against which the composite material can be molded; providing a plurality of discrete filler particles; placing a plurality of discrete filler particles against the surface; preventing the particles from shifting freely along the surface; directing a liquified matrix material against the particles on the surface; and solidifying the matrix material to unite the discrete particles and matrix material into a composite structure.

22 Claims, 2 Drawing Sheets

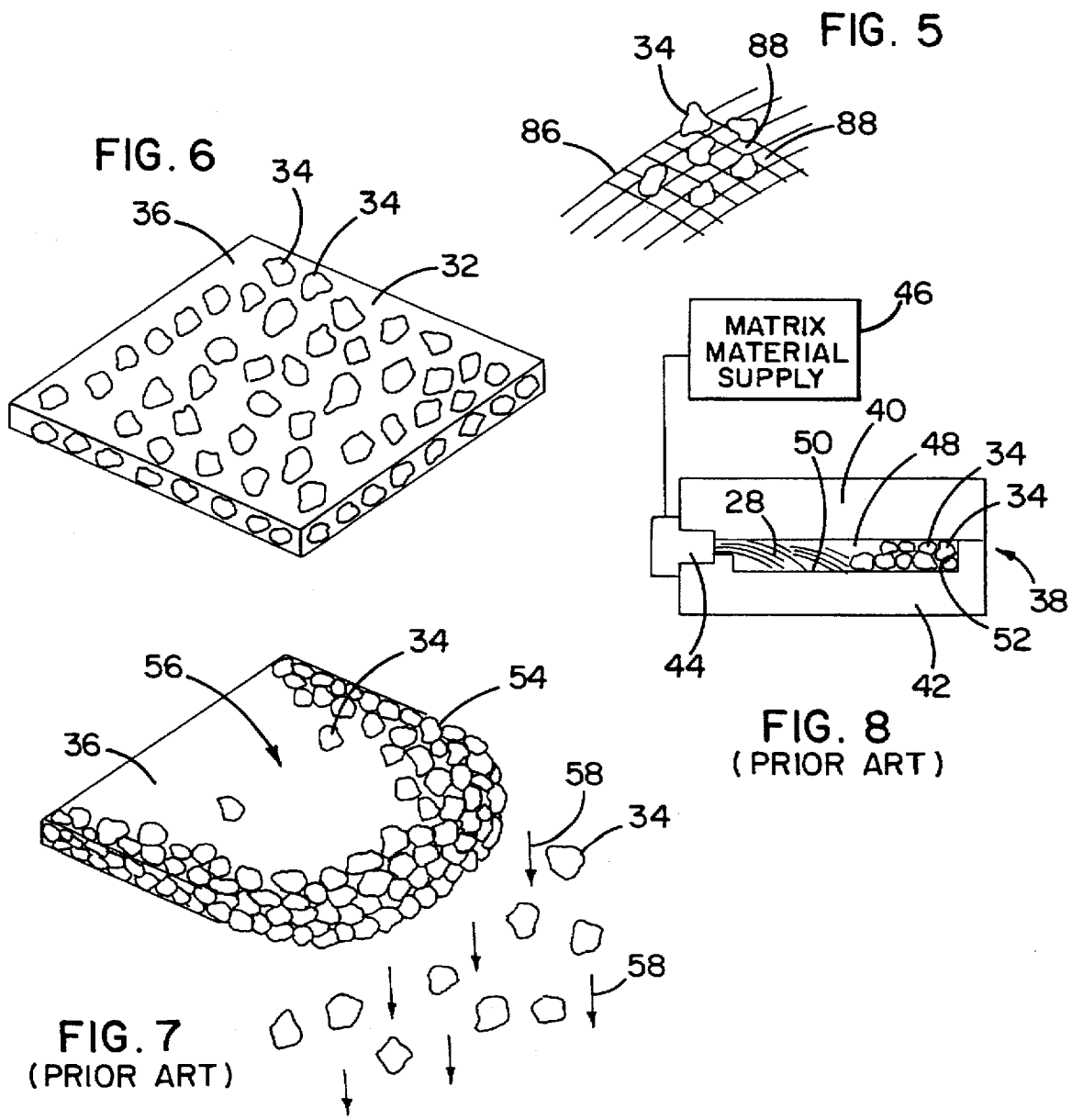

METHOD AND APPARATUS FOR FORMING COMPOSITE MATERIAL INCLUDING SOLID FILLER PARTICLES

This application is a continuation of application Ser. No. 07/581,767, filed Sep. 13, 1990, now abandoned.

BACKGROUND OF THE INVENTION

1. Field of the Invention

This invention relates to composite material formation utilizing discrete solid filler particles and, more particularly, to a method of unifying a plurality of the discrete filler particles into a solidified matrix material, and to a mold structure for facilitating performance of the method.

2. Background Art

It is known to form thermoplastic polymers by injecting liquified resin into a mold cavity and to thereafter cool and solidify the resin to maintain a desired shape, as dictated by the configuration of the mold cavity. Formation of structures by extrusion molding and injection molding thermoplastic polymers is common in the art.

Commonly, the polymer employed is polyurethane, polyurea, epoxy, and dicyclopentadiene. In using these polymers, oligomer or monomer units of a liquified material are mixed with a catalyst before injection into the mold cavity in which they are gelled and subsequently polymerized. When the injection mold is airtight, this formation process is characterized in the art as reactive injection molding (RIM).

For various reasons, two of which are cost and weight reduction, a solid filler material is commonly placed in the mold cavity and bonded with a solidified matrix material to produce a composite structure. Commonly used filler materials are calcium carbonate glass fiber, mica, barium sulfate, as well as others. The method of forming a composite material using glass fiber and polyurethane is known in the art as RRIM.

To perform the above molding process, a liquified matrix material is introduced to the mold cavity through a nozzle. Commonly, the nozzle will have a diameter not greater than 3 mm. The dimension of the nozzle is generally chosen to facilitate melting of the thermoplastic polymer, obtain correct equivalent mixing ratios in the case of forming polyurethane through reaction, and obtain a desired pressure in the case of reactive injection molding (RIM).

When the matrix and filler materials are premixed and thereafter injected into the mold cavity, the filler material particles must be sufficiently small to flow freely through the nozzle. If filler particles bind or lodge in the nozzle, the flow may be hindered or altogether blocked.

As an example, the RRIM process using premixed glass fiber and polyurethane usually requires the dimension of the glass fiber particles to be less than approximately 300 μm. If the dimension of the glass fiber particles exceeds 300 μm, the required mixing ratio between the polyol and isocyanate components may be altered. Further problems may be that the mixing pressure is reduced resulting in incomplete mixing or the nozzle itself may be clogged, which results in uneven or blocked flow.

The nozzle restrictions have made premixing of the matrix and filler materials at times impractical. Characteristics of the end composite structure may depend on the dimensions of the solid filler particles. Consequently, at times it may be desirable to add a composite material with large solid filler materials. Filler material is generally cheaper and lighter in weight than the matrix material. The designer, however, must generally balance the oft times competing objectives of weight and cost reduction against maximizing the integrity of the end product. It is common to reduce filler particle dimensions below those desired to assure proper formation and integrity of the end product.

Another problem that is encountered with premixed matrix and filler is that, even if smaller filler particles would produce desired characteristics for the completed composite structure, it may be impractical to provide filler material of small enough size. There is a great emphasis today on recycling of materials. It is common, for example, to make particulate filler material from thermoplastic goods or from materials that are other than thermoplastic in nature. It is difficult, and sometimes too expensive to be feasible, to grind existing articles into particulate of useable size. For example, in the case of granulating a once-molded polyurethane, polyurea, epoxy, dicyclopentadiene, polyester, or phenol borax, conventional grinding techniques may result in a particle diameter of several millimeters. To achieve an oft times desired, smaller particle diameter, i.e. on the order of several hundred μm, conventional grinding techniques might be impractical. Grinding produces heat which may cause fusion of the very small particles. Alternatives to grinding to produce the desired size may be too costly to be feasible.

To obviate the problems associated with injecting premixed matrix and filler materials, it is known to scatter filler particles in a mold cavity and to separately pour/inject the liquified matrix into the mold and against the scattered particles. While this obviates the need to pass the filler particles through a nozzle and thus permits a wider range of particle size to be employed, this introduces a new problem. The incoming liquified matrix material tends to push the particles so that they accumulate downstream. This results in a non-uniform distribution of the filler particles in the end composite structure. At the same time, the accumulation of particles may reach a level that the matrix material cannot effectively embrace the particles. Detrimental voids are also produced. The result may be that the individual particles may break off and/or that the composite structure may be inherently weak. Also, once the particles break off, the shape of the end composite structure may vary unacceptably.

SUMMARY OF THE INVENTION

The present invention is specifically directed to overcoming the above-enumerated problems in a novel and simple manner.

The present invention comprehends a method of forming a composite material including the steps of: providing a surface against which the composite material can be molded; providing a plurality of discrete filler particles; placing a plurality of discrete filler particles against the surface, preventing the particles from shifting freely along the surface; directing a liquified matrix material against the particles on the surface; and solidifying the matrix material to unite the discrete particles and matrix material into a composite structure.

With the inventive method, filler particles of quite large dimension can be placed on the surface without the requirement of premixing and injection through a nozzle. The filler particles can be readily evenly scattered over the surface. The inventive method results in maintenance of the uniform dispersion of the filler particles in the end composite structure. By preventing the particles from freely moving along the surface, the relocation and accumulation of particles resulting from the introduction of the liquified matrix, as by pouring or injection, can be avoided.

Various methods of preventing free sliding of the particles on the surface are contemplated by the invention. One such method is to make the particles attractive to the surface. This can be accomplished by placing an adhesive on one or the other of the filler particles and surface. Liquid adhesive or an adhesive tape can be used. Alternatively, a film can be placed against the one surface, with the film having opposite first and second surfaces. The first surface is placed against the surface of the mold and the second surface is exposed to the particulate filler. The second surface can be coated with an adhesive to adhere the filler particles thereto. The surface against the mold surface need not be adhered thereto.

As an alternative to an adhesive, various other structures are contemplated by the invention. For example, a pocket(s) can be provided in the mold surface to receive one or more filler particles. A plurality of projections and hollows can be provided on the surface for the same purpose. The pockets/projections and hollows preferably have dimensions on the order of 1-4 times the dimension of the discrete particles. Other types of irregularities on the surface are also contemplated. The objective of the irregularities/pockets/projections and hollows, in any form, is to cause the particles to either seat/nest in a recess or become snagged thereon so as to hang up at a particular spot on the surface. To enhance hangup, the particles are preferably formed with one or more jagged edges which edge is prone to catching on the projections in the surface.

The invention also contemplates the provision of a separate structure for placement against the surface. For example, a mesh-type net/grid can be placed over the surface to define an effectively roughened surface to cause particles to hang up. The net, as the earlier described film, becomes integrated into the end composite structure.

The filler particles can be made from virtually an infinite number of materials. Exemplary materials which are preferred are as follows: calcium carbonate glass fiber, mica, barium sulfate, recycled polyurethane, polyurea, epoxy, dicyclopentadiene, polyester and phenol borax.

Particles in excess of 2 mm can be conveniently used with the inventive method. These particles, such as bumper scrap scale is useable with side dimensions preferably between 4-10 mm. The use of elongate particles is also contemplated. Preferred dimensions of the elongate particles are in the range between 10-100 mm. At the same time, extremely small particles can be used. Diameters of less than approximately 300 µm are also contemplated.

The preferred matrix material is a thermoplastic polymer, such as polyurethane, polyurea, epoxy, or dicyclopentadiene, however, this is not to be viewed as restrictive.

The invention also contemplates the provision of more than a single layer of the discrete particles on the surface. The provision of a second layer causes an interlock of the particles of the first and second layers to result in a high integrity end product. At the same time, the particles are sufficiently spaced that the liquified matrix can flow freely therearound to surround and positively lock the second layer particles in place.

In one form of the invention, the surface resides within a mold cavity, which is airtight and which has structure for injecting the liquified matrix material into the mold cavity. The invention also contemplates a method of forming the composite structure using a mold having an internal mold cavity and including the steps of: introducing a plurality of discrete filler particles against the surface; holding a plurality of the discrete filler particles each in a predetermined position with respect to the surface; injecting a liquified matrix material into the mold cavity against the discrete filler particles held in the predetermined positions; and solidifying the matrix material to unify the filler particles and matrix material to define the composite structure.

The invention also comprehends a mold for forming composite structures consisting of discrete filler particles and a solidified matrix material. The mold consists of a plurality of surfaces defining an internal mold cavity in which the composite material is formed, structure for causing discrete particles in the mold cavity to hang up on one surface therein to prevent particles from freely sliding over the one surface, and structure for injecting a liquified matrix material into the mold cavity to bind the discrete particles and unify the filler particles and solidified matrix material into a composite structure.

BRIEF DESCRIPTION OF THE DRAWINGS

FIG. 4 is a view of the mold of FIG. 3 in a closed state and with liquified matrix material being introduced to the mold cavity;

FIG. 5 is a perspective view of a net material according to the present invention, which can be substituted for the film of FIGS. 3 and 4 and the projections and hollows of FIGS. 1 and 2 on the surface against which the filler particles are placed to prevent particle sliding;

FIG. 6 is a perspective view of a composite structure made according to the present invention;

FIG. 7 is a perspective view of a similar type composite structure to that in FIG. 6, but made according to conventional techniques; and FIG. 8 is a side elevation view of a prior art mold of the type useable to form the structure of FIG. 7.

DETAILED DESCRIPTION OF THE DRAWINGS

Figure 1:
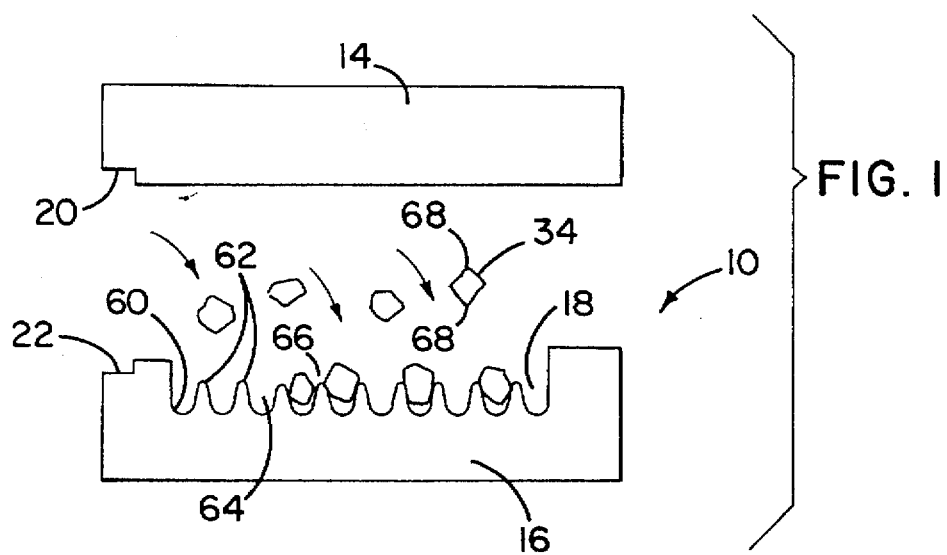
FIG. 1 is a side elevation view of a two-part mold system according to the present invention with separated first and second mold parts and showing particulate filler material being introduced to a cavity bounded by a mold surface, with projections and hollows according to the invention thereon to prevent free sliding of the particles along the surface.
Figure 2:
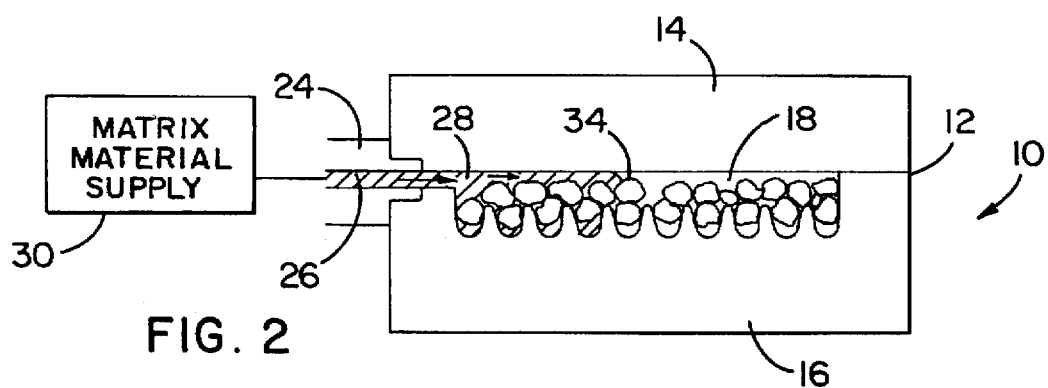
FIG. 2 is a side elevation view of the mold in a closed state with particulate filler material in place and with liquified matrix material being introduced to the mold cavity.

Reference is first made to the mold system shown at 10 in FIGS. 1 and 2. The mold system 10 consists of a two-part mold housing 12 with a first upper mold part 14 and a second lower mold part 16, which is matable with the first mold part 14 to define an internal mold cavity 18.

Each of the mold parts 14, 16 has an undercut 20, 22 to accommodate a nozzle 24 having a passageway therethrough 26 in communication with the mold cavity 18. Matrix material 28, in liquid form, is introduced from a supply 30 under pressure through the passageway 26 into the mold cavity 18. The system 10 shown in FIGS. 1 and 2 is preferably an airtight system.

The mold system at 10 is used to produce a composite structure, such as that shown at 32 in FIG. 6. The structure 32 may take any shape, as dictated by the configuration of the mold cavity 18, and may be used in a variety of different environments. The inventive structure can be used particularly effectively to form, for example, sound insulating matt for automobiles.

The composite structure consists of a plurality of discrete, solid filler particles 34 embedded in the solidified matrix material 36. It is desirable with such structure to distribute the filler particles uniformly throughout the matrix 36. This minimizes the number and size of voids and results in firm embedding of the particles 34 to produce a high integrity product.

One serious problem that has plagued the art is demonstrated in FIGS. 7 and 8. In FIG. 8, a conventional-type mold is shown at 38 to include first and second mold parts 40, 42, respectively, corresponding to the mold parts 14, 16 in FIGS. 1 and 2. A nozzle 44 directs liquified matrix material from a supply 46 into a mold cavity 48, as with the earlier described system 10.

Before the mold parts 40, 42 are joined, the particles 34 are distributed evenly on the smooth, recessed, bottom surface 50 of the mold part 42 as densely as desired in the end product. The mold parts 40, 42 are then joined, after which the matrix material 28 is introduced through the nozzle 44. Because the material 28 is introduced under pressure, the incoming matrix material 36 shifts the particles 34 to the right in FIG. 8 along the smooth bottom surface 50. There is little resistance to the sliding of the particles 34 on the surface 50 so that the particles accumulate at the wall 52 and spread out therefrom around the periphery of the cavity 48. This buildup pattern can be seen on the completed, composite structure 54 shown in FIG. 7. The result is that the central portion 56 of the structure 54 has no or few particles 34 distributed therein, whereas around the periphery, the particles are very dense. Because of the density of the particles 34, certain of those particles may be shielded from the incoming liquified matrix material 28. Voids develop. Consequently, those particles 34 with little or no matrix material contacting them are not unified with the solidified matrix 36 so that upon the structure 54 being removed from the mold system at 38, many of the particles 34 break readily off of the matrix 36, as indicated by the arrows 58 in FIG. 7. Those particles 34 that remain intact with the matrix material 36 may be insufficiently bonded to the matrix 36 so that the overall integrity of the structure 54 may be unsuitable for its intended purpose. Further, if a significant number of the particles 34 break off, the structure looses its desired shape, which thereby makes the prior system in FIG. 8 unsuitable for precision molding.

This problem is obviated by the present invention, as shown in FIGS. 1–5. Returning to FIGS. 1 and 2, one means of solving the problem of shifting filler particles 34, according to the present invention, is to provide irregularities in the upwardly facing solid surface 60. This provides means for preventing free sliding of the particles and holds the particles and their original distribution pattern. In the illustrated embodiment, a plurality of projections 62 are provided in between which hollows 64 are defined. The individual hollows 64 define receptacles/pockets for at least a portion of the particles 34 that are distributed on the surface 60 before the mold system 10 is closed. FIG. 1 shows several of the particles 34 hung up/nested in the hollows 64.

Once the mold is closed, the incoming matrix material 28 will be exerting a force primarily from left to right in FIGS. 1 and 2. The projections 62 prevent the particles nested in the hollows 64 from shifting under the liquid pressure. Consequently, the distribution of particles established with the mold open will remain the same after the introduction of the liquid matrix material 28.

The invention also contemplates the provision of one or more additional layers of particles 34. As seen in FIGS. 1 and 2, the particles in the underlying, first layer define seats 66 between adjacent particles 34 in which the particles in the overlying/second layer can nest to be similarly confined against shifting under the force of the incoming matrix material 28.

To assure that the particles 34 are held firmly in place, preferably the particles 34 are made with jutting, jagged edges, as indicated on one exemplary particle 34 at 68 in FIG. 1. The filler particles 34 can be made from any of virtually an infinite number of materials. In a preferred form, the filler material is made from one of calcium carbonate glass fiber, mica, barium sulfate, recycled polyurethane, polyurea, epoxy, dicyclopentadiene, polyester, or phenol borax.

The dimension of the particles 34 can also vary over a wide range, as dictated by the desired characteristics of the end structure and the mold size. Large and very small particles are intended to be used. Usually, the preferred diameter of particles is not less than 2 mm. As earlier noted, the configuration of the particles can be arbitrary so long as they are able to be smoothly scattered in the mold cavity, but preferably the jagged edges are formed to facilitate nesting in the hollows 64. It is common, for example, to recycle bumper scraps into relatively thin particles 34 have widths of 4–10 mm. Particles with an elongate configuration are also useable with dimensions preferably in the range from 10–100 mm. The particles of course should not be sufficiently large to block the incoming flow of liquid matrix material 28. Small particles i.e. less than 300 µm can also be effectively used. As a rule of thumb, it is preferred that the projections 62 and hollows 64 have dimensions from the same as to up to four times that of the solid filler particles 34.

The matrix material likewise can be selected from a virtually unlimited number of compositions. It is preferred that a thermoplastic polymer, such as polyurethane, polyurea, epoxy, or dicyclopentadiene be used.

Figure 3:
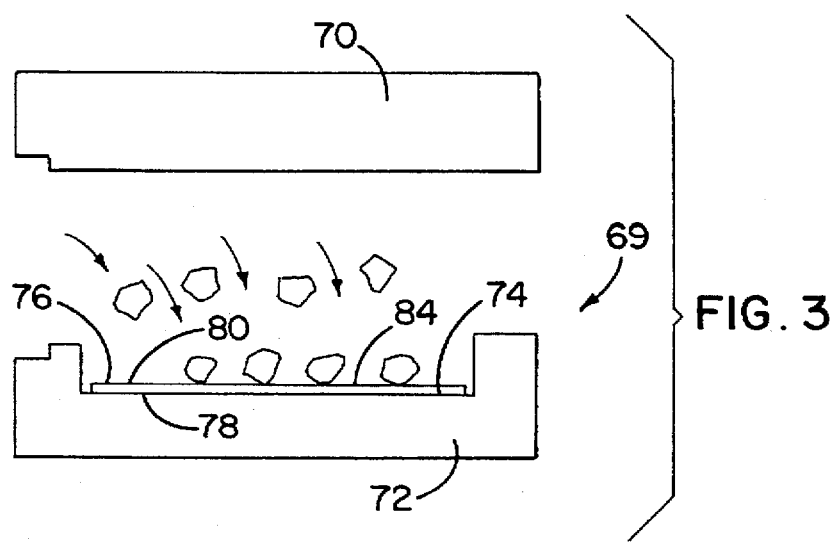
FIG. 3 is a view as in FIG. 1 of a modified form of system according to the invention with an adhesive film on a surface of the cavity in place of the projections and hollows.

FIGS. 3 and 4 show an alternative form of the invention. The mold system at 70, shown in FIGS. 3 and 4, has corresponding first and second mold parts 70, 72, respectively, defining a mold cavity 74. The liquid matrix material 28 is introduced through a nozzle 24, as in the prior embodiment.

The systems 70 and 10 are primarily different in that the second mold part 72 in the system 70 has a flat, upwardly facing solid surface 74 against which the particles 34 are placed, as in the prior art system of FIG. 8. The surface 74 has no irregularities, i.e. holding means that prevent free movement, such as the projections 62 and hollows 64 in the system 10. Instead, the corresponding holding/preventing means is a film 76 placed over the surface 74. The film 76 has a first surface 78 for facial engagement with the mold surface 74 and a second surface 80 exposed to and bounding the cavity 82. An adhesive layer 84 is provided on the second surface 80 of the film 76 and causes the particles 34 placed thereagainst to adhere thereto and thereby remain in a relatively fixed position. The molding process then proceeds as described with respect to the system of FIGS. 1 and 2. There is no need to adhere the first film surface 70 to the mold part 72, though this is within the scope of the invention. Preferably, the film is just laid against the surface 74 without employing an adhesive.

An adhesive could be applied directly to the surface 74, without the need for the intermediate film 76. A liquid adhesive could be used or the adhesive could be in the form of an adhesive tape.

FIG. 5 shows an alternative means for holding and preventing free sliding movement of the particles along the mold surfaces 60, 74 of the mold systems 10, 70, respectively. FIG. 5 depicts a mesh/net 86 defining a grid pattern with squared pockets/receptacles 88 into which the particles can settle and nest. Once the particles 34 are nested in the mesh/net 86, the mesh/net 86 resists sliding along the cavity surface 60, 74. When adhesive tape and/or the mesh/net 86 are used, the tape and/or mesh/net 86 become integrated into the final product. In making a sound insulating matt, as for the floor of an automobile, the mold cavities 18, 82 generally have a thickness on the order of 5 mm, which means that one or two layers of solid filler particles 34 are present in a depthwise direction for the final product.

The following are examples of specific methods of practicing the invention.

EXAMPLE I

A mold having cavity dimensions of 340×340×5 mm was used. The filler particles were made from recycled polyurethane from an automobile bumper, molded according to the RIM method. The polyurethane was processed to have a particle diameter of 4 mm.

Polyether polyol (OH equivalent: 28 mgKOH/g) and MDI were mixed in NCO index 100 to be used as the liquified matrix material.

The mixing ratio between the solid filler particles and liquified matrix material was 2:3 by weight.

Adhesive tape of 30 mm in width was placed in strips, edge to edge, to produce a combined surface area of 335× 335 mm on the surface of the bottom mold part. The particles were then scattered over the adhesive tape.

The upper mold part was then coupled to the lower mold part to define a cavity into which the liquified matrix material, consisting of polyol, MDI, and amine catalysts, was injected.

After securing the composite material in the mold for several minutes, a finished product with evenly distributed particles throughout the polyurethane matrix, as shown in FIG. 6, resulted.

EXAMPLE II

Instead of using the adhesive tape of Example I, a lower mold part as shown in 16 in FIG. 1 was employed, with projections and hollows each having a dimension of 4 mm in depth and 10 mm in diameter. The liquid matrix material of Example I was injected into the mold with the result being a product as shown in FIG. 6 i.e. with evenly distributed filler particles throughout the matrix.

A similar process was then carried out with a conventional type system, such as that shown in FIG. 8. The solid particles were scattered on the lower mold surface, the mold was closed and the liquified matrix material injected. After several minutes of curing, a product very similar to that shown in FIG. 7 was produced. The filler particles concentrated around the periphery of the completed composite structure. Around the periphery, a very small amount of the liquified polyurethane matrix material contacted the outermost particles. Once the product was removed from the mold, a substantial number of solid filler particles dropped off. This resulted also in the shape of the completed product changing considerably from that which was desired.

It should be understood that while injection molding is described above, the inventive concept comprehends simple pouring of the liquid matrix over filler particles held on a surface.

The foregoing disclosure of specific embodiments is intended to be illustrative of the broad concepts comprehended by the invention.

We claim:

1. A method of forming a composite structure comprising the steps of:

providing a solid surface against which the composite structure can be molded;

providing a plurality of discrete filler particles;

placing a plurality of discrete filler particles directly against the solid surface;

providing means on the surface for preventing said discrete particles on said surface from shifting freely along said surface, said preventing means comprising a plurality of pockets formed as one piece with the solid surface, each said pocket configured to receive a substantial portion of a discrete filler particle to prevent the discrete particle in the pocket from sliding along said solid surface;

directing a liquified matrix material against said discrete particles on the surface; and solidifying the matrix material to unite the plurality of discrete particles and matrix material into said composite structure.

2. The method according to claim 1 wherein said preventing means comprises at least one pocket in said surface for reception of at least a part of at least one of said discrete particles.

3. The method according to claim 1 wherein said preventing means comprises a plurality of projections and hollows on the surface.

4. The method according to claim 1 wherein the matrix material is a thermoplastic polymer.

5. The method according to claim 1 wherein said surface resides within and bounds part of a mold cavity.

6. The method according to claim 1 including the steps of providing an airtight mold with an internal cavity bounded by said surface and injecting the liquified matrix material in the mold cavity.

7. The method according to claim 1 wherein a plurality of the discrete filler particles are made at least partly of at least one of calcium carbonate glass fiber, mica, barium sulfate, re-cycled polyurethane, polyurea, epoxy, dicyclopentadiene, polyester, and phenol borax.

8. The method according to claim 1 wherein a plurality of the discrete particles have a diameter less than approximately 300 µm.

9. The method according to claim 1 wherein a plurality of the discrete particles have a diameter greater than 2 mm.

10. The method according to claim 1 wherein a plurality of the discrete particles are elongate with lateral and longitudinal dimensions, in the range of 10–100 mm.

11. The method according to claim 1 wherein a plurality of the discrete particles have jagged edges.

12. The method according to claim 1 including the steps of providing a first layer of discrete particles on the surface and a second layer of discrete particles against the first layer of discrete particles.

13. The method according to claim 2 wherein the pocket has a depth between one to four times the dimension of the discrete particles.

14. A method of forming a composite structure comprising the steps of:

providing a mold having an internal mold cavity bounded by a surface;

introducing a plurality of discrete filler particles against said surface;

holding a plurality of the discrete filler particles directly against the surface each in a predetermined position with respect to the surface without bonding the plurality of discrete filler particles to the surface;

injecting a liquified matrix material into the mold cavity against the discrete filler particles held in said predetermined positions;

solidifying the matrix material to unify a plurality of the discrete filler particles and matrix material to define the composite structure; and separating the composite structure from the mold surface.

15. The method according to claim 1 wherein there are a plurality of projections and hollows on the surface in which the discrete particles nest to hold the discrete particles in said predetermined positions.

16. The method according to claim 15 wherein there is a second surface facing said first claimed surface, and the second surface does not have therein projections and hollows as on said first claimed surface.

17. A method of forming a composite structure comprising the steps of:

providing a surface against which the composite structure can be molded;

providing a plurality of discrete, incompressible filler particles;

providing means on the surface to prevent shifting of the discrete filler particles with the means projecting from the surface a distance not greater than the height of any of the discrete particles;

placing the plurality of discrete filler particles directly against the surface;

directing a liquified matrix material against said discrete parties on the surface with the surface facing upwardly;

solidifying the matrix material to unite the plurality of discrete particles and matrix material into said composite structure, said discrete filler particles tending to remain in place on the surface without being bonded thereto as the matrix material is directed thereagainst; and separating the composite structure from the surface.

18. The method of forming a composite structure according to claim 17 where the filler particles are one of calcium carbonate, glass fiber, mica and barium sulfate.

19. The method of forming a composite structure according to claim 17 wherein the surface bounds a cavity in a mold.

20. The method of forming a composite structure according to claim 19 including the step of closing the mold cavity, providing an opening in communication with the mold cavity and injecting the matrix material through said opening into the cavity.

21. The method according to claim 17 wherein said preventing means comprises a net/mesh element.

22. A method of forming a composite structure comprising the steps of:

providing a solid surface against which the composite structure can be molded;

providing a plurality of discrete filler particles;

placing a plurality of discrete filler particles directly against the solid surface;

providing means on the surface for preventing said discrete particles on said surface from shifting freely along said surface, said preventing means comprising a plurality of pockets formed integrally with the solid surface, each said pocket configured to receive a substantial portion of a discrete filler particle to prevent the discrete particle in the pocket from sliding along said solid surface;

directing a liquified matrix material against said discrete particles on the surface;

solidifying the matrix material to unite the plurality of discrete particles and matrix material into said composite structure; and separating the composite structure from the solid surface.

* * * * *